United States Patent [19]

London

[11] Patent Number: 4,556,118
[45] Date of Patent: Dec. 3, 1985

[54] TILT LOCKOUT SYSTEM FOR TILT-CAB TRUCKS

[75] Inventor: Alvan G. London, Camdenton, Mo.

[73] Assignee: Applied Power, Brookfield, Wis.

[21] Appl. No.: 614,706

[22] Filed: May 29, 1984

Related U.S. Application Data

[63] Continuation of Ser. No. 344,378, Feb. 1, 1982, abandoned.

[51] Int. Cl.[4] .................. B62D 27/04; B62D 33/06
[52] U.S. Cl. ............................ 180/89.15; 296/190
[58] Field of Search .............. 180/41, 89.14–89.16; 280/6 H, 711, 714; 296/35.1, 190; 248/561, 573, 574, 631, 344, 378

[56] References Cited

U.S. PATENT DOCUMENTS

| | | | |
|---|---|---|---|
| Re. 29,938 | 3/1979 | Knutson | 180/89.15 |
| 3,761,123 | 9/1973 | Neill et al. | 91/452 |
| 3,797,882 | 3/1974 | Brimhall | 292/110 |
| 3,841,693 | 10/1974 | Reynolds et al. | 292/111 |
| 3,948,341 | 4/1976 | Foster | 180/89.15 |
| 3,958,659 | 5/1976 | Selman | 180/89.15 |
| 4,372,411 | 2/1983 | Flower | 180/89.15 |
| 4,483,409 | 11/1984 | Fun | 180/89.15 |

FOREIGN PATENT DOCUMENTS 2347492 4/1974 Fed. Rep. of Germany ...... 296/190

*Primary Examiner*—Robert B. Reeves
*Assistant Examiner*—Dennis H. Pedder
*Attorney, Agent, or Firm*—John J. Byrne; Bradford E. Kile; Devin M. O'Brien

[57] ABSTRACT

Disclosed is a tilt lockout system for tilt-cab trucks which extends the shock absorber and spring assemblies adjacent the tilt axis to their maximum strokes prior to initiation of the tilt cycle and locks them in that position throughout the tilt cycle.

6 Claims, 4 Drawing Figures

TILT LOCKOUT SYSTEM FOR TILT-CAB TRUCKS

This application is a continuation of application Ser. No. 344,378, filed Feb. 1, 1982, now abandoned.

FIELD OF THE INVENTION

This invention relates to tilt-cab trucks. More specifically, it relates to means for protecting the shock absorbers, the spring assemblies, and other truck components adjacent the tilt axis during the tilt cycle.

BACKGROUND OF THE INVENTION

Tilt-cab truck cabs are normally attached to their chassis by shock absorber and spring assemblies which permit relative movement of the cab and the chassis as the truck moves over the road. When the cab is tilted relative to the chassis for maintenance or the like, the shock absorber and spring assemblies remote from the tilting axis are normally released from one or the other of those two components and are not involved in the tilting operation. However, the shock absorber and spring assemblies adjacent to the tilting axis normally remain "on line." Since the release of the other shock absorbers and spring assemblies and the pivoting of the cab places the entire weight of the cab on the shock absorber and spring assemblies adjacent to the tilting axis, there is a tendency for the assemblies to "fall through" their stroke. Such an uncontrolled fall can result in damage both to the cab and to components fixed to the chassis, such as the radiator.

SUMMARY OF THE INVENTION

The subject invention is a tilt lockout system for tilt-cab trucks which extends the shock absorber and spring assemblies adjacent the tilt axis to their maximum strokes prior to initiation of the tilt cycle and locks them in that position throughout the tilt cycle.

DETAILED DESCRIPTION OF THE PRESENTLY PREFERRED EMBODIMENTS

The First Embodiment

Figure 1:
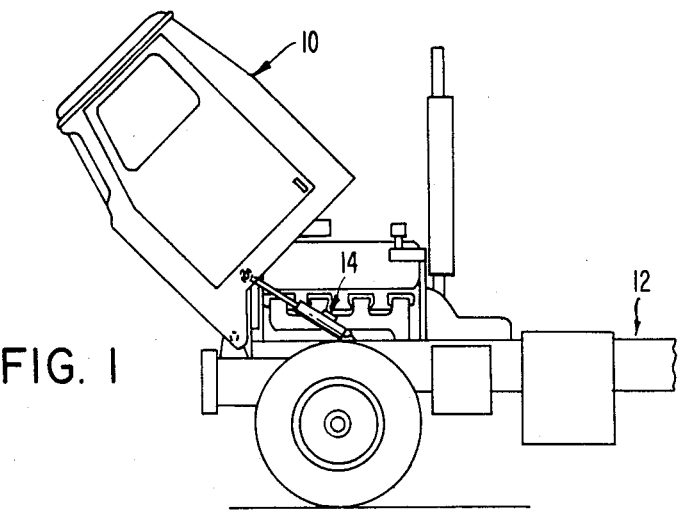
FIG. 1 is a side view of a conventional tilt-cab tractor disclosing an operative environment of the subject invention.
Figure 2:
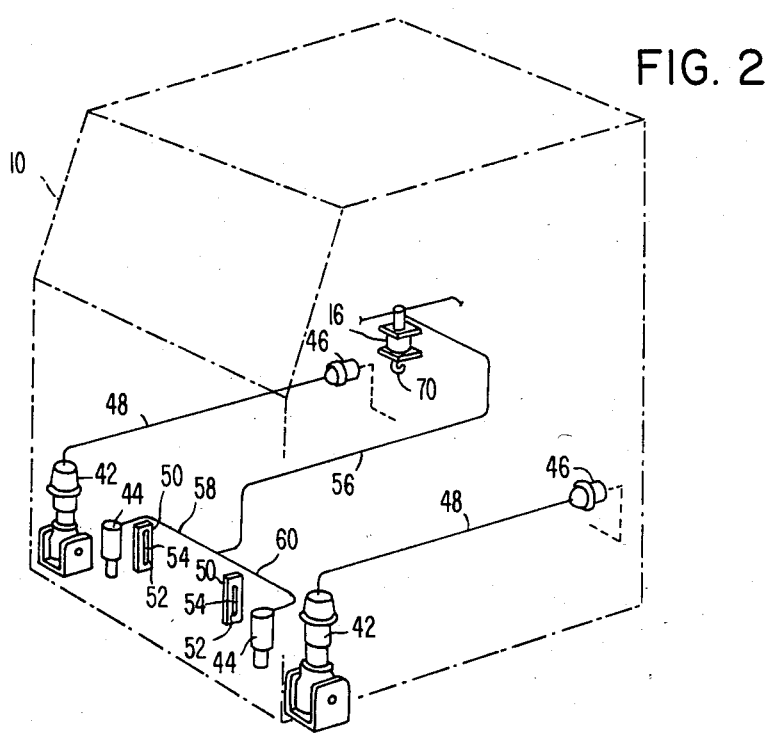
FIG. 2 is a schematic perspective view of a first embodiment of a lockout system according to the present invention.

FIGS. 1 and 2 show a conventional pivoting truck cab 10 to help locate the various components of the system in a typical application. The truck cab 10 is mounted on a chassis 12 for a tilting movement about horizontal transverse axis located at the front of the cab 10. Tilting movement of the cab 10 is accomplished by extension and contraction of tilting cylinders 14 which are pivotably attached at one end to the chassis 12 and at the other end to the cab 10. When the cab 10 is in its normal, down portion (shown in FIG. 2), the rear end of the cab 10 is latched to the chassis by hydraulic latch mechanism 16 (only one of which is shown in FIG. 1). Such hydraulic latch mechanisms are well known in the subject art and are disclosed, for example, in U.S. Pat. No. Re. 29,938, of common assignment with the instant application.

A pump 18 (shown in FIG. 3) is used to extend and contract the tilting cylinder 14, and, when hydraulic fluid from the pump 18 is supplied to the push chambers of the tilting cylinders 14 via hydraulic lines 20, 22, and 24, and 20, 22, and 26, hydraulic fluid is simultaneously supplied to the hydraulic latch mechanisms 16 via hydraulic lines 20, 28 and 20, 28, and 30 to open the hydraulic latch mechanisms 16. Hydraulic fluid from the pump 18 is supplied to the pull chambers of the tilting cylinders 14 via hydraulic lines 32, 34, and 36 and 32, 38, and 40.

Shock absorber and spring assemblies 42 are located at the front of the cab 10 between the chassis and the cab 10, and, as previously mentioned, it is the purpose of this invention to protect the shock absorbers, the spring assemblies, and surrounding structure during the tilt cycle. To accomplish this result, the first embodiment includes two hydraulic lift cylinders 44 disposed between the chassis 12 and the cab 10 adjacent to (and preferably on line with) the tilt axis of the cab. When extended, the lift cylinders 44 cause the shock absorber and spring assemblies 42 to extend to their full length, where they lock at the top of their strokes for the duration of the cab tilt cycle. The lift cylinders 44 are sized so that they will extend their full length before the tilting cylinders 14 begin to extend.

In the embodiment illustrated in FIG. 2, the shock absorber and spring assemblies 42 include air springs (not illustrated) to which air under pressure is supplied from accumulators 46 via hydraulic lines 48. However, it will be appeciated that the usefulness of this invention is not limited to any specific type of shock absorber and spring assembly.

To guide the cab 10 as it rises on the lift cylinders 44, crash brackets 50 containing vertical slots 52 are provided on either the chassis or the cab 10, and guide pins 54 mounted on the other of the chassis or the cab 10 are received in the vertical slots 52. The lift cylinders 44 are extended and retracted by the same pump 18 which operates the tilt cylinders 14 and the latching mechanisms 16. This is accomplished simply by connecting the lift cylinders 44 in series with one of the latching mechanisms 16 via hydraulic lines 56, 58, and 60. Thus, after the latching mechanism 16 has been released, hydraulic fluid is supplied through the hydraulic lines 56, 58, and 60 to the push chambers of the two lift cylinders 44, causing their rods to extend.

After the pump 18 has extended the tilt cylinder 14, it may be turned off, since it is no longer needed to supply power. However, the hydraulic fluid in the push chambers of the lift cylinders 44 is held in place by a one-way check valve 62 (shown in FIGS. 3 and 4) in the base of the latch mechanism 16 to which the hydraulic line 56 is connected. Thus, the shock absorber and spring assemblies 42 normally remain rigidly locked at the top of their stroke for as long as the cab 10 remains tilted.

When the cab 10 returns to its down and locked position, a conventional mechanical release, such as shown in U.S. Pat. Re. No. 29,938, unseats the check valve 62, releasing the pressure in the push chambers of the lift cylinders 44. The pressurized hydraulic fluid is released through hydraulic lines 60, 58, and 56, check valve 62, and hydraulic lines 28 and 20.

Preferably the lift cylinders 44 are not attached to the cab 10. That way, they will be compressed by the initial motion of the cab 10 relative to the chassis and thereafter offer no resistance to the cab's suspension system.

The Second Embodiment

Figure 3:
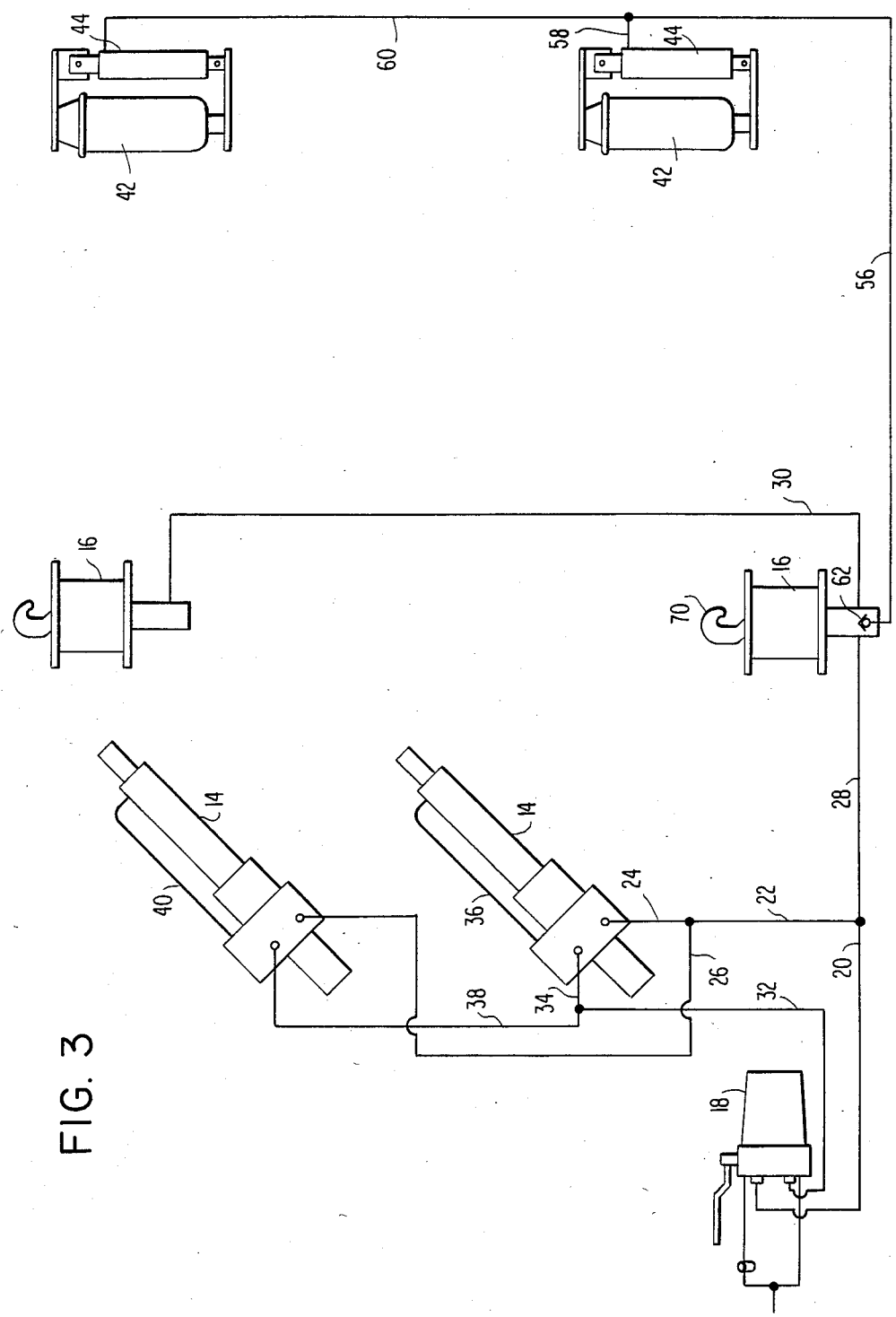
FIG. 3 is a schematic diagram of the hydraulic circuitry of the first embodiment of this invention.
Figure 4:
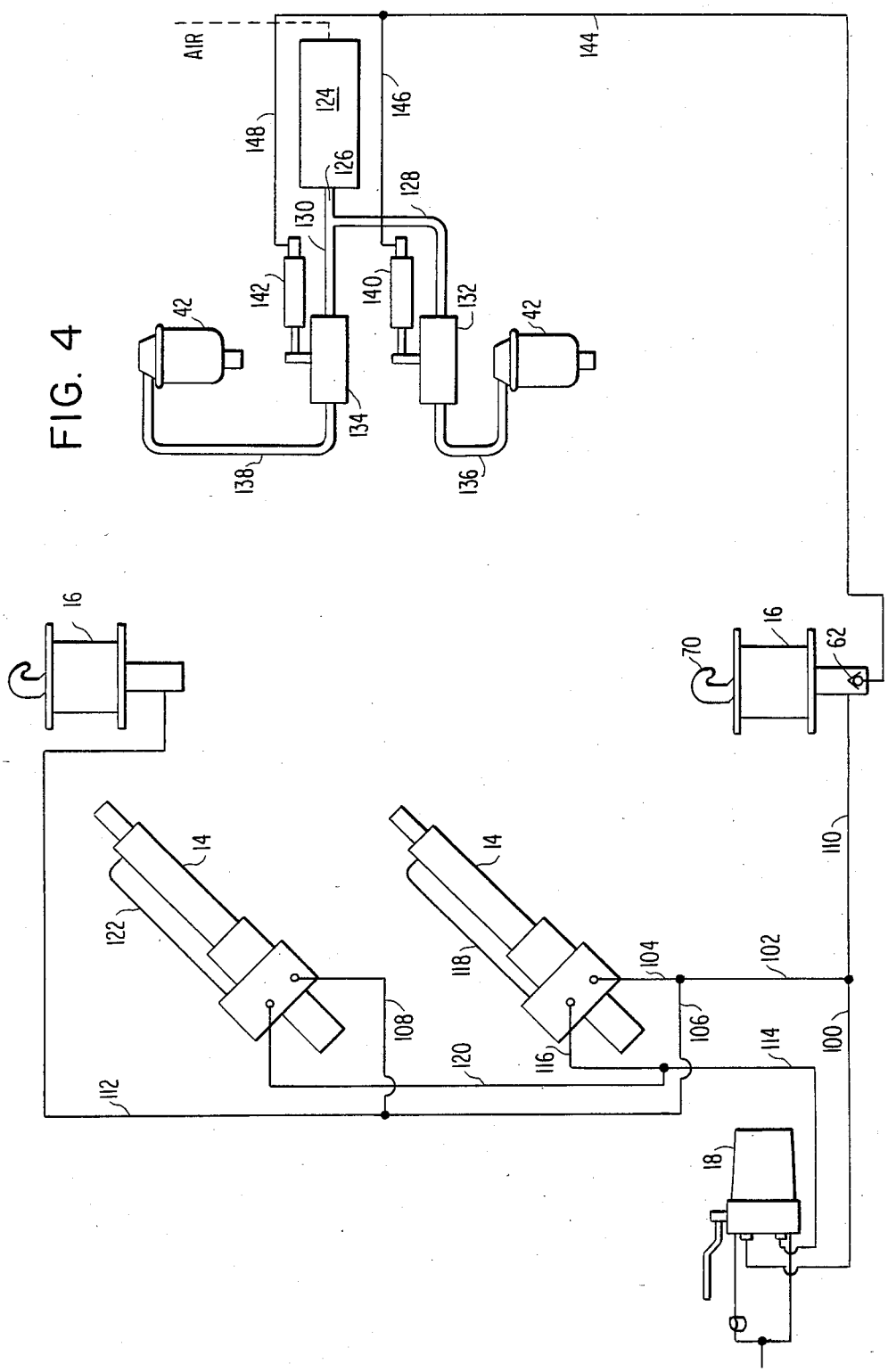
FIG. 4 is a schematic diagram of the hydraulic circuitry of a second embodiment of this invention.

The embodiment shown in FIG. 4 is generally similar to the embodiment shown in FIG. 3 and is also intended for use in a pivoting cab environment as shown in FIGS. 1 and 2. In this embodiment, tilting movement of the cab 10 is accomplished by extension and contraction of tilting cylinders 14 which are pivotally attached at one end to the chassis 12 and at the other end to the cab 10. When the cab 10 is in its normal, down position (shown in FIG. 1), the rear end of the cab 10 is latched to the chassis by hydraulic latch mechanisms 16. A pump 18 is used to extend and contract the tilting cylinder 14, and, when hydraulic fluid from the pump 18 is supplied to the push chambers of the tilting cylinders 14 via hydraulic lines 100, 102, and 104 and 100, 102, 106, and 108, hydraulic fluid is simultaneously supplied to the hydraulic latch mechanisms 16 via hydraulic lines 100, 110 and 100, 102, 106, and 112. Hydraulic fluid from the pump 18 is supplied to the pull chamber of the tilting cylinders 14 via hydraulic lines 114, 116, and 118 and 114, 120, and 122.

Shock absorber and air spring assemblies 42 are located at the front of the cab 10 between the chassis and the cab 10, as in the first embodiment. The second embodiment, however, has no lift cylinders 44, but operates on a different principal. In the second embodiment, when it is desired to tilt the cab 10, the shock absorber and air spring assemblies 42 are first extended to their maximum stroke by supplying additional air to the air springs in the assemblies. The air is supplied to the air springs from accumulator 124 via air lines 126, 128 and 126, 130, ball valves 132, 134, and air lines 136, 138. Extra lifting pressure is supplied to the accumulator 124 via an external source of air pressure labeled AIR in FIG. 4 to extend the air springs.

Hydraulic fluid is then supplied to spring-return actuators 140, 142 via hydraulic lines 144, 146, and 148. The actuators 140, 142 close the ball valves 132, 134 before the tilting cylinders 14 begin to extend. The ball valves 132, 134 in turn shut off flow from the shock absorber and air spring assemblies 42 to the accumulator 124, thus locking the shock absorber and air spring assemblies in place. Check valve 62 keeps the actuators extended until the check valve 62 is tripped by the cab 10 returning to the over-the-road position.

CAVEAT

While the present invention has been illustrated by a detailed description of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

I claim:

1. In a tilt-cab truck comprising:
   (a) a chassis;
   (b) a cab mounted on said chassis and pivotable with respect to said chassis about an axis;
   (c) first means for tilting said cab about said axis back and forth between a lowered first position and a raised second position; and
   (d) shock absorber and spring means between said chassis and said cab located in the vicinity of said axis, the improvement comprising second means to extend said shock absorber and spring means to their maximum stroke prior to activation of said first means to initiate a tilting cycle and to lock said shock absorber and spring means to their maximum stroke throughout the tilting cycle.

2. In a tilt-cab truck as recited in claim 1, the further improvement wherein said second means comprises a hydraulic cylinder.

3. In a tilt-cab truck as recited in claim 1, the further improvements wherein:
   (a) said first and second means both comprise hydraulic cylinders and
   (b) said first and second means are both powered by the same hydraulic pump.

4. In a tilt-cab truck as recited in claim 3, the further improvements wherein:
   (a) said tilt-cab truck further comprises a hydraulic latching mechanism for latching said cab to said chassis when said cab is in its lowered first position and
   (b) said hydraulic latching mechanism is also powered by said hydraulic pump.

5. In a tilt-cab truck as recited in claim 1, the further improvements wherein:
   (a) said shock absorber and spring means comprises an air spring and
   (b) said second means comprises a valve which prevents escape of air from said air spring.

6. In a tilt-cab truck as recited in claim 5, the further improvement wherein:
   (a) said valve is hydraulically actuated by means of an actuator and
   (b) said first means and said actuator are both powered by the same hydraulic pump.

* * * * *